United States Patent
Kaiya et al.

(10) Patent No.: US 6,545,076 B2
(45) Date of Patent: Apr. 8, 2003

(54) SILICONE COMPOSITION FOR FORMING A RELEASE COATING

(75) Inventors: Nobuo Kaiya, Chiba Prefecture (JP); Takateru Yamada, Chiba Prefecture (JP); Shuji Yamada, Chiba Prefecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/848,755

(22) Filed: May 3, 2001

(65) Prior Publication Data

US 2001/0056167 A1 Dec. 27, 2001

(30) Foreign Application Priority Data

May 26, 2000 (JP) .......................................... 2000-156790

(51) Int. Cl.$^7$ ................................................. C08K 5/54
(52) U.S. Cl. ............................ 524/268; 528/15; 528/31; 528/32
(58) Field of Search ................................ 524/268; 528/15, 528/31, 32

(56) References Cited

U.S. PATENT DOCUMENTS

| | | | | |
|---|---|---|---|---|
| 4,609,574 A | | 9/1986 | Keryk et al. .............. 427/407.1 |
| 4,726,964 A | * | 2/1988 | Isobe et al. ................. 427/387 |
| 4,845,164 A | * | 7/1989 | Gutek ........................ 528/15 |
| 5,145,933 A | * | 9/1992 | Grisoni et al. ............... 528/15 |
| 5,239,035 A | * | 8/1993 | Maxson ..................... 528/15 |
| 5,281,656 A | * | 1/1994 | Thayer et al. ............... 524/601 |
| 5,371,163 A | * | 12/1994 | Wilson ........................ 525/478 |
| 5,432,006 A | * | 7/1995 | Kessel et al. ................ 427/387 |
| 5,708,075 A | * | 1/1998 | Chung et al. ................ 427/387 |
| 6,136,447 A | * | 10/2000 | Nakamura et al. ........... 399/338 |

FOREIGN PATENT DOCUMENTS

| | | | | |
|---|---|---|---|---|
| EP | 0371404 A2 | | 6/1990 | ......... C09D/183/07 |
| EP | 661335 A | * | 7/1995 | |
| EP | 1004632 A1 | | 5/2000 | ........... C08L/83/04 |
| JP | 62-86061 | | 4/1987 | ............ C09D/3/82 |
| JP | 7-258606 | | 10/1995 | ......... C09D/183/05 |
| JP | 9-125004 | | 5/1997 | ......... C09D/183/07 |

* cited by examiner

*Primary Examiner*—Margaret G. Moore
*Assistant Examiner*—Marc S Zimmer
(74) *Attorney, Agent, or Firm*—Patricia M. Scaduto

(57) ABSTRACT

A solvent free silicone composition for forming a cured release coating comprising (A) 100 parts by weight of a diorganopolysiloxane having in each molecule at least two alkenyl groups and a viscosity of 50 to 5,000 mPa·s at 25° C.;

(B) 3 to 50 parts by weight of an organohydrogenpolysiloxane mixture comprising constituent (b-1) and constituent (b-2) in a weight ratio of 1:0.01 to 1:1, where (b-1) is a diorganopolysiloxane having a viscosity of 1 to 1,000 mPa·s at 25° C. and having both molecular terminals capped with silicon-bonded hydrogen atoms and (b-2) is an organohydrogenpolysiloxane having a viscosity of 1 to 1,000 mPa·s at 25° C. and having at least three pendant silicon-bonded hydrogen atoms in each molecular chain; and (C) a catalytic amount of a platinum-type catalyst.

19 Claims, No Drawings

SILICONE COMPOSITION FOR FORMING A RELEASE COATING

FIELD OF THE INVENTION

The present invention relates to a silicone composition for forming a release coating and in particular to a non-solvent type silicone composition for forming a cured release coating for adhesive substances on the surfaces of various sheet-like substrates such as paper, synthetic resin films, and metal foil.

BACKGROUND OF THE INVENTION

Known in the art is a method of obtaining a material that imparts release properties for adhesive substances, the material being produced by applying a curable silicone composition on the surface of a sheet-like substrate such as paper, laminated paper, synthetic resin film, and metal foil and then forming a cured coating by heating the aforementioned composition. It is also known that the main components of the silicone composition used in the above method for forming a cured coating are an organohydrogenpolysiloxane and an organopolysiloxane with alkenyl groups. The composition is subjected to an addition reaction in the presence of a platinum-type, catalyst to cure. For example, Japanese Patent Application Laid-Open Number (Kokai) Hei 9-125,004 describes a composition which consists of an organopolysiloxane having a high degree of polymerization containing hexenyl groups, an organohydrogenpolysiloxane, a platinum catalyst, and an organic solvent. Since the diorganopolysiloxane with hexenyl groups used as a main component is a substance of a high molecular weight, it has to be dissolved in an organic solvent. However, the use of an organic solvent creates problems associated not only with the health of the workers but with increased costs since it requires the use of special means for preventing evaporation thereof into the atmosphere.

It has also been proposed to use silicone compositions for forming peelable cured coating films without organic solvents. For example, Japanese Patent Application Laid-Open Number (Kokai) Sho 62-86061 discloses a silicone composition comprising an organopolysiloxane having a low degree of polymerization with hexenyl groups, an organohydrogenpolysiloxane, and a platinum-type catalyst. Japanese Patent Application Laid-Open Number (Kokai) Hei 7-258,606 discloses a silicone composition comprising an organopolysiloxane having a low degree of polymerization with vinyl groups, an organohydrogenpolysiloxcane, and a platinum-type catalyst. Although both these silicone compositions are free of the aforementioned problems associated with the use of organic solvents and decrease in residual adhesiveness of the adhesive substances attached to the peelable cured film at high speeds of peeling from paper (e.g., greater than 50 m/min), the dependency of the resistance to peeling on the speed of peeling becomes low. This may create problems in applications that require certain properties. For example, the aforementioned compositions are not suitable for use in conjunction with peelable paper having different properties on both sides (i.e., for peelable paper having on both sides peelable coating films with difference in peeling resistance).

It is an object of the present invention to provide a silicone composition for forming a release coating with high dependency of the resistance to peeling on peeling speed. Another object is to provide a silicone composition for forming a release coating which is not prone to a decrease in residual adhesiveness of the adhesive substance attached to the cured film.

SUMMARY OF THE INVENTION

The present invention relates to a solvent-free silicone composition for forming a cured release coating comprising (A) 100 parts by weight of a diorganopolysiloxane having in each molecule at least two alkenyl groups and a viscosity of 50 to 5,000 mPa·s at 25° C.;

(B) 3 to 50 parts by weight of an organohydrogenpolysiloxane mixture comprising constituent (b-1) and constituent (b-2) in a weight ratio of 1:0.01 to 1:1, where (b-1) is a diorganopolysiloxane having a viscosity of 1 to 1,000 mPa·s at 25° C. and having both molecular terminals capped with silicon-bonded hydrogen atoms and (b-2) is an organohydrogen polysiloxane having a viscosity of 1 to 1,000 mPa·s at 25° C. and having at least three pendant silicon-bonded hydrogen atoms in each molecular chain; and (C) a catalytic amount of a platinum-type catalyst.

DESCRIPTION OF THE INVENTION

The present invention relates to a solvent-free silicone composition for forming a cured release coating comprising (A) 100 parts by weight of a diorganopolysiloxane having in each molecule at least two alkenyl groups and a viscosity of 50 to 5,000 mPa·s at 25° C.;

(B) 3 to 50 parts by weight of an organohydrogenpolysiloxane mixture comprising constituent (b-1) and constituent (b-2) in a weight ratio of 1:0.01 to 1:1, where (b-1) is a diorganopolysiloxane having a viscosity of 1 to 1,000 mPa·s at 25° C. and having both molecular terminals capped with silicon-bonded hydrogen atoms and (b-2) is an organohydrogen polysiloxane having a viscosity of 1 to 1,000 mPa·s at 25° C. and having at least three pendant silicon-bonded hydrogen atoms in each molecular chain; and (C) a catalytic amount of a platinum-type catalyst.

The diorganopolysiloxane that constitutes component (A) is a main component of the present composition. It is required that this component contain in each molecule at least two silicon-bonded alkenyl groups. The following are examples of the aforementioned alkenyl groups: vinyl, allyl, butenyl, 5-hexenyl, octenyl, and decenyl. Among these, preferred are vinyl and 5-hexenyl. It is recommended that the contents of the aforementioned alkenyl groups provide 0.2 to 10 mole % and preferably 1 to 5 mole % of the total organic groups of component (A). The alkenyl groups can be bonded to molecular terminals, pendant (i.e. bonded to non-terminal silicon atoms), or both. Organic groups, other than alkenyl bonded to silicon atoms are represented by monovalent hydrocarbon groups such as methyl, ethyl, propyl, butyl, pentyl, hexyl, or similar alkyl groups; phenyl, tolyl, xylyl, or similar aryl groups; and benzyl, phenethyl, or similar aralkyl groups. Among these most preferred are methyl groups. It is recommended that component (A) have a viscosity of 50 to 5,000 mPa·s at 25° C. and preferably 100 to 2,000 mPa·s at 25° C.

The organohydrogenpolysiloxane mixture comprising component (B) functions as a cross-linking agent. Constituent (b-1) of component (B) is a diorganopolysiloxane having silicon-bonded hydrogen atoms on both its molecular terminals. Organic groups other than hydrogen atoms bonded to silicon can be represented by monovalent hydrocarbons free of aliphatic unsaturated bonds, such as methyl, ethyl, propyl, butyl, pentyl, hexyl, and similar alkyl groups; phenyl, tolyl, xylyl, and similar allyl groups; and benzyl, phenethyl, and similar aralkyl groups. It is recommended that constituent (b-1) have a viscosity of 1 to 1,000 mPa·s at 25° C. and preferably 2 to 500 mPa·s at 25° C.;

Constituent (b-2) of component (B) is an organohydrogenpolysiloxane having at least three pendant (i.e. bonded to non-terminal silicon atoms) silicon-bonded hydrogen atoms in each molecular chain. Silicon-bonded organic groups other than hydrogen atoms can be represented; by monovalent hydrocarbons free of aliphatic unsaturated bonds such as methyl, ethyl, propyl, butyl, pentyl, hexyl, and similar alkyl groups; phenyl, tolyl, xylyl, and similar allyl groups; and benzyl, phenethyl, and similar aralkyl groups. The aforementioned organohydrogen polysiloxane may have a linear, cyclic, branched, or a resin-like molecular structure. It is recommended that constituent (b-2) have a viscosity of 1 to 1,000 mPa·s at 25° C. and preferably 2 to 500 mPa·s at 25° C.

A decrease in the amount of constituent (b-1) in the mixture comprising constituents (b-1) and (b-2) reduces resistance to peeling at high peeling speeds. Therefore it is recommended that the aforementioned constituents (b-1) and (b-2) be used in a weight ratio of 1:0.01 to 1:1 and preferably in a weight ratio of 1:0.01 to 1:0.5, and even more preferably in a ratio of 1:0.05 to 1:0.4.

It is recommended that component (B) be used in an amount of 3 to 50 parts by weight based on 100 parts by weight of component (A). If the content of component (B) is less than 3 parts by weight, the present composition will not cure sufficiently. If, on the other hand, the contents of component (B) exceed 50 parts by weight, this will lead to an increase in resistance to peeling at low peeling speeds and to variations of the peeling resistance with time.

Component (C) is a platinum catalyst which in the present composition is used for acceleration of curing. This component can be represented by metallic platinum such as platinum black, platinum supported on a carrier such as silica or activated carbon, or by platinum-type compounds such as a chloroplatinic acid, an alcoholic solution of chloroplatinic acid, an olefin complex of chloroplatinic acid, a diketone complex of chloroplatinic acid, and a complex of a chloroplatinic acid and 1,3-divinyltetramethyl disiloxane. It is recommended that component (C) be used in a catalytic quantity and preferably in such an amount at which the contents of metallic platinum is within 1 to 1,000 ppm (by weight) based on the, sum of the weights of components (A) and (B).

The present composition is composed of the aforementioned components (A) to (C). However, if necessary to decrease resistance to peeling at low peeling speeds, the composition can be combined with 1 to 20 parts by weight of component (D) which is a dimethylpolysiloxane having a viscosity of 1 to 1,000,000 mPa·s at 25° C. In addition, within the limits not detrimental to the objects of the present invention, the present composition may incorporate various additives conventionally combined with silicone compositions for forming peelable cured coatings such as cure inhibitors, fine powdered silica or similar inorganic: fillers, pigments, heat-resistant additives, powdered organic resins, and dyes. From the point of view of coatability, it is recommended that the present composition have a viscosity of 50 to 5,000 at mPa·s at 25° C. and preferably 50 to 3,000 mPa·s at 25° C.

The present composition can be prepared by uniformly mixing the aforementioned components (A) to (C). If desired, components (A) and (B) can be first premixed and then this mixture can be mixed with component (C).

When applied onto various substrate materials such as plain paper, laminated paper, synthetic resin films, and metal foil with subsequent curing, the present composition forms a coating film peelable from an adhesive substance on the surface of a substrate. Therefore this composition is suitable for use as a release coating on a substrate, in particular as a peelable liner for a paper with different adhesiveness on both sides, e.g., for a double-sided adhesive tape. Since the present composition does not contain an organic solvent, the use of this composition is advantageous from the point of view of environmental safety and improvement in working conditions. Furthermore, by changing the ratio of components (A) and (B), it becomes possible to control resistance to peeling at low peeling speeds, i.e. below 0.3 m/min.

PRACTICAL EXAMPLES

The invention will be further described in detail with reference to practical examples. In these examples, viscosity values are values measured at 25° C. Resistance to peeling of a cured coating film formed from the silicone composition of the invention, as well as residual adhesiveness of the adhesive substance (%) were measured by the methods described below.

Resistance to Peeling

A predetermined amount of a silicone composition was applied onto the surface of paper and a cured coating was formed. An acryl-type adhesive agent (a product of Toyo Ink Co., Ltd.; trademark "Oribain BPS8170") was applied onto the cured coating film and curing was carried out with dry heating for 2 min. at 70° C. A laminate paper was then laminated onto the adhesive layer, a 20 $g/cm^2$ load was applied to the laminate paper, and the laminated unit was retained under this load for 24 hours under conditions of 25° C. temperature and 60% relative humidity. The laminate paper was then stretched at an angle of 180° with the use of a Tensiron and a high-speed peeling tester at stretching rates of 0.3 m/min, 50 m/min, and 100 m/min, and the force (gf) required for peeling was measured. Samples used in all tests had a width of 5 cm.

Residual Adhesiveness

A predetermined amount of a silicone composition was cured onto the surface of paper, an adhesive tape (a product of Nitto Denko Co., Ltd.; trademark "Nitto Polyester Adhesive Tape 31B") was laminated onto the cured coating, and the unit was aged for 20 hours at 70° C. under a load of 20 $g/cm^2$. The adhesive tape was then peeled off and applied on a stainless steel plate. After being held for 30 min at 25° C. under a load of 20 $g/cm^2$, the adhesive tape was stretched at an angle of 180° at a stretching rate of 0.3 m/min and the force (gf) required for peeling was measured. In a blank test, the adhesive tape (a product of Nitto Denko Co., Ltd.; trademark "Nitto Polyester Adhesive Tape 31B") was laminated onto a Teflon sheet, and the force (gf) required for peeling was measured in the same manner as mentioned above. The residual adhesiveness (%) can be calculated from the measured value with the use of the following formula:

Residual Adhesiveness (%)={(force required for peeling the adhesive tape from the cured coating film of silicone composition)(gf)/(force required for peeling the adhesive tape from the Teflon sheet)(gf)}×100.

Practical Example 1

A mixture was prepared by uniformly mixing the following components: 100 parts by weight of a copolymer of methylhexenylsiloxane and dimethylsiloxane having both molecular terminals capped with dimethylhexenylsiloxy groups (viscosity of 200 mPa·s); 13.8 parts by weight of dimethylpolysiloxane having both molecular terminals capped with dimethylhydrogensiloxy groups (0.12 Wt. % of silicon-bonded hydrogen atoms, viscosity 15 mPa·s); 1.5 parts by weight of methylhydrogenpolysiloxane having both molecular terminals capped with trimethylsiloxy groups (1.6 Wt. % of silicon-bonded hydrogen atoms, viscosity 20 mPa·s; 0.3 parts by weight of 1-ethenyl-1-cyclohexanol; and 10 parts of dimethylpolysiloxane having both molecular terminals capped with trimethylsiloxy groups (viscosity 300,000 mPa·s). The mixture was then combined with a complex of a chloroplatinic acid and 1,3-divinyltetramethyldisiloxane in an amount providing 200 ppm (by weight) metallic platinum. By this method, a silicone composition for forming a peelable curable coating having a viscosity of 400 mPa·s was prepared having a ratio of SiH to SiVi of 1.1, where Vi represent vinyl.

The obtained silicone composition was applied onto the surface of polyethylene-laminated wood-free paper in an amount of about 1 g/m$^2$ and was cured by heating for 20 sec. at 130° C. Resistance to peeling and residual adhesiveness of the obtained cured silicone film were measured and the results are given in Table 1.

Comparative Example 1

A silicone composition with the same 1.1 ratio of SiH to SiVi as in Practical Example 1 was prepared by the same method as in Practical Example 1, with the exception that 1.04 parts by weight of methylhydrogen polysiloxane capped with trimethylsiloxy groups (1.6 Wt. % of silicon-bonded hydrogen atoms, viscosity 20 mPa·s) were used instead of 13.8 parts by weight of dimethylpolysiloxane having both molecular terminals capped with dimethylhydrogensiloxy groups (0.12 Wt. % of silicon-bonded hydrogen atoms, viscosity 15 mPa·s) used in Practical Example 1. The obtained silicone composition was applied on the surface of polyethylene-laminated wood-free paper in an amount of about 1 g/m$^2$ and was cured by heating for 20 sec. at 130° C. Resistance to peeling and residual adhesiveness of the cured silicone coating were measured are the results are given in Table 1.

Comparative Example 2

A silicone composition having a viscosity of 400 mPa·s was prepared by the same method as in Practical Example 1, with the exception that 1.5 parts by weight of dimethylpolysiloxane capped with dimethylhydrogensiloxy groups (0.12 Wt. % of silicon-bonded hydrogen atoms, viscosity 15 mPa·s) were used instead of 1.5 parts by weight of methylhydrogenpolysiloxane having both molecular terminals capped with trimethylsiloxy groups (1.6 Wt. % of silicon-bonded hydrogen atoms, viscosity 20 mPa·s) used in Practical Example 1. The obtained silicone composition was applied on to the surface of polyethylene-laminated wood-free paper in an amount of about 1 g/m$^2$ and was cured by heating for 20 sec. At 130° C. However, since the obtained cured coating did not adhere to the polyethylene-laminated wood-free paper used as a substrate, this silicone composition appeared to be unsuitable for preparation of a silicone release coating.

Practical Example 2

A mixture was prepared by uniformly mixing the following components: 20 parts by weight of a dimethylpolysiloxane having both molecular terminals capped with dimethylvinylsiloxy groups (viscosity of 2000 mPa·s, 0.2 Wt. % contents of vinyl groups); 80 parts by weight of dimethylpolysiloxane having both molecular terminals capped with dimethylvinylsiloxy groups (viscosity 370 mPa·s, 0.47 Wt. % contents of vinyl groups); 14.5 parts by weight of dimethylpolysiloxane capped with dimethylhydrogensiloxy groups (0.12 Wt. % of silicon-bonded hydrogen atoms, viscosity 15 mPa·s); 1.5 parts by weight of a copolymer of methylhydrogen siloxane and dimethylsiloxane having both molecular terminals capped with trimethylsiloxy groups (30 mole % dimethylsiloxane units and 70 mole % methylhydrogen siloxane units 1 Wt. % of silicon-bonded hydrogen atoms, viscosity 70 mPa s); and 0.1 part by weight of 3-methyl-1-buten-3-ol. The mixture was then combined with a complex of chloroplatinic acid and 1,3-divinyltetramethyldisiloxane in an amount providing 200 ppm (by weight) of metallic platinum. The result was a silicone composition having a viscosity of 300 mPa·s and a ratio of SiH to SiVi of 2.1. The silicone composition was applied onto the surface of polyethylene-laminated wood-free paper in an amount of about 1 g/m$^2$ and was cured by heating for 20 sec. at 130° C. Resistance to peeling and residual adhesiveness of the cured silicone coating were measured and the results are given in Table 1.

Comparative Example 3

A silicone composition with the same ratio of SiH to SiVi as in Practical Example 2 was prepared by the same method as in Practical Example 1, with the exception that 1.74 parts by weight of a copolymer of methylhydrogen siloxane and dimethylsiloxane having both molecular terminals capped with trimethylsiloxy groups (30 mole % dimethylsiloxane units and 70 mole % methylhydrogen siloxane units; 1 Wt. % of silicon-bonded hydrogen atoms, viscosity 70 mPa·s) were used instead of 14.5 parts by weight of dimethylpolysiloxane capped with dimethylhydrogensiloxy groups (0:12 Wt. % of silicon-bonded hydrogen atoms, viscosity 15 mPa·s) used in Practical Example 2. The silicone composition was applied onto the surface of polyethylene-laminated wood-free paper in an amount of about 1 g/m$^2$ and was cured by heating at 130° C. for 20 sec. Resistance to peeling and residual adhesiveness of the cured silicone film were measured and the results are given in Table 1.

Comparative Example 4

A silicone composition having a viscosity of 300 mPa·s was prepared by the same method as in Practical Example 2, with the exception that 1.5 parts by weight of dimethylpolysiloxane capped with dimethylhydrogensiloxy groups (0.12 Wt. % of silicon-bonded hydrogen atoms, viscosity 15 mPa·s) were used instead of 1.5 parts by weight of a copolymer of methylhydrogen siloxane and dimethylsiloxane having both molecular terminals capped with trimethylsiloxy groups (30 mole % dimethylsiloxane units and 70 mole % methylhydrogen siloxane units) used in Practical Example 2. The silicone composition was applied onto the surface of polyethylene-laminated wood-free paper in an amount of about 1 g/m$^2$ and heated at 130° C. for 20 sec., however the silicone composition would not cure.

TABLE 1

|  | Resistance to Peeling (gf/5 cm) | | | Residual Adhesiveness (%) |
| --- | --- | --- | --- | --- |
|  | 0.3 m/min | 50 m/min | 100 m/min |  |
| Pr. Ex. 1 | 15 | 186 | 292 | 94 |
| Pr. Ex. 2 | 33 | 226 | 366 | 99 |
| Comp. Ex. 1 | 15 | 104 | 164 | 94 |
| Comp. Ex. 3 | 32 | 120 | 190 | 98 |

We claim:

1. A solvent-free silicone composition for forming a cured release coating comprising
   (A) 100 parts by weight of a diorganopolysiloxane having in each molecule at least two alkenyl groups and a viscosity of 50 to 5,000 mPa·s at 25° C.;
   (B) 3 to 50 parts by weight of an organohydrogenpolysiloxane mixture comprising constituent (b-1) and constituent (b-2) in a weight ratio of 1:0.01 to 1:1, where (b-1) is a diorganopolysiloxane having a viscosity of 1 to 1,000 mPa·s at 25° C. and having both molecular terminals capped with silicon-bonded hydrogen atoms and (b-2) is an organohydrogenpolysiloxane having a viscosity of 1 to 1,000 mPa·s at 25° C. and having at least three pendant silicon-bonded hydrogen atoms in each molecular chain;
   (C) a catalytic amount of a platinum-type catalyst; and
   (D) 1 to 20 parts by weight of a dimethylpolysiloxane having a viscosity of 100 to 1,000,000 mPa·s at 25° C.

2. The silicone composition of claim 1, where the alkenyl group in component (A) is 5-hexenyl.

3. The silicone composition of claim 1, where the alkenyl group in component (A) is vinyl.

4. The silicone composition of claim 1, where constituent (b-1) is a dimethylpolysiloxane having both terminals of the molecular chain capped with dimethylhydrogensiloxy groups.

5. The silicone composition of claim 1, where constituent (b-2) is selected from the group consisting of trimethylsiloxy-capped methylhydrogenpolysiloxane and trimethylsiloxy-capped copolymer of dimethylpolysiloxane and methylhydrogensiloxane.

6. The silicone composition of claim 1, where component (A) has a viscosity of 100 to 2,000 mPa·s at 25° C.

7. The silicone composition of claim 1, where component (b-1) has a viscosity of 2 to 500 mPa·s at 25° C.

8. The silicone composition of claim 1, where component (b-2) has a viscosity of 2 to 500 mPa·s at 25° C.

9. The silicone composition of claim 1, where component (A) has a viscosity of 100 to 2,000 mPa·s at 25° C., component (b-1) has a viscosity of 2 to 500 mPa·s at 25° C., and component (b-2) has a viscosity of 2 to 500 mPa·s at 25° C.

10. The silicone composition of claim 1, where the weight ratio of constituent (b-1) to constituent (b-2) is 1:0.01 to 1:0.5.

11. The silicone composition of claim 1, where the weight ratio of constituent (b-1) to constituent (b-2) is 1:0.05 to 1:0.4.

12. A cured silicone release coating formed by curing a solvent-free silicone composition comprising
    (A) 100 parts by weight of a diorganopolysiloxane having in each molecule at least two alkenyl groups and a viscosity of 50 to 5,000 mPa·s at 25° C.;
    (B) 3 to 50 parts by weight of an organohydrogenpolysiloxane mixture comprising constituent (b-1) and constituent (b-2) in a weight ratio of 1:0.01 to 1:1, where (b-1) is a diorganopolysiloxane having a viscosity of 1 to 1,000 mPa·s at 25° C. and having both molecular terminals capped with silicon-bonded hydrogen atoms and (b-2) is an organohydrogenpolysiloxane having a viscosity of 1 to 1,000 mPa·s at 25° C. and having at least three pendant silicon-bonded hydrogen atoms in each molecular chain;
    (C) a catalytic amount of a platinum-type catalyst; and
    (D) 1 to 20 parts by weight of a dimethylpolysiloxane having a viscosity of 100 to 1,000,000 mPa·s at 25° C.

13. The cured silicone release coating according to claim 12, where the alkenyl group in component (A) is selected from the group consisting of 5-hexenyl and vinyl.

14. The cured silicone release coating according to claim 12, where constituent (b-1) is a dimethylpolysiloxane having both terminals of the molecular chain capped with dimethylhydrogensiloxy groups and constituent (b-2) is selected from the group consisting of trimethylsiloxy-capped methylhydrogenpolysiloxane and trimethylsiloxy-capped copolymer of dimethylpolysiloxane and methylhydrogensiloxane.

15. The cured silicone release coating according to claim 12, where component (b-1) has a viscosity of 2 to 500 mPa·s at 25° C.

16. The cured silicone release coating according to claim 12, where component (b-2) has a viscosity of 2 to 500 mPa·s at 25° C.

17. The cured silicone release coating according to claim 12, where component (A) has a viscosity of 100 to 2,000 mPa·s at 25° C., component (b-1) has a viscosity of 2 to 500 mPa·s at 25° C., and component (b-2) has a viscosity of 2 to 500 mPa·s at 25° C.

18. The cured silicone release coating according to claim 12, where the weight ratio of constituent (b-1) to constituent (b-2) is 1:0.01 to 1:0.5.

19. The cured silicone release coating according to claim 12, where the weight ratio of constituent (b-1) to constituent (b-2) is 1:0.05 to 1:0.4.

* * * * *